United States Patent [19]

Millard et al.

[11] Patent Number: 4,779,118
[45] Date of Patent: Oct. 18, 1988

[54] EXPOSURE CONTROL WITH FIXED TIME EXPOSURE AT HIGH LIGHT LEVELS

[75] Inventors: John B. Millard, Cohasset; George D. Whiteside, Lexington, both of Mass.

[73] Assignee: Polaroid Corporation, Cambridge, Mass.

[21] Appl. No.: 129,483

[22] Filed: Dec. 7, 1987

[51] Int. Cl.4 .............................................. G03B 7/08
[52] U.S. Cl. ................................... 354/436; 354/443; 354/414
[58] Field of Search ............... 354/435, 436, 437, 439, 354/441, 443, 456, 458, 446, 451, 452, 473, 414

[56] References Cited

U.S. PATENT DOCUMENTS

| | | | |
|---|---|---|---|
| 3,762,285 | 10/1973 | Tenkumo et al. | 354/458 |
| 3,896,460 | 7/1975 | Sahara et al. | 354/443 |
| 3,942,183 | 3/1976 | Whiteside | 354/29 |
| 4,192,587 | 3/1980 | LaRocque et al. | 354/27 |
| 4,315,676 | 2/1982 | LaRocque et al. | 354/27 |
| 4,329,031 | 5/1982 | Carcia et al. | 354/23 D |
| 4,342,506 | 8/1982 | Johnson et al. | 354/27 |
| 4,345,825 | 8/1982 | Matteson et al. | 354/443 |
| 4,354,748 | 10/1982 | Grimes et al. | 354/443 |
| 4,375,322 | 3/1983 | Coppa et al. | 354/27 |
| 4,423,936 | 1/1984 | Johnson | 354/403 |
| 4,512,648 | 4/1985 | Mizokami | 354/443 |
| 4,534,639 | 8/1985 | Konishi et al. | 354/443 |

Primary Examiner—Russell E. Adams
Attorney, Agent, or Firm—David R. Thornton

[57] ABSTRACT

A camera having an automatic exposure system for providing decreasing aperture-interval values with increasing ambient light levels including an ambient light level sensor element for detecting an ambient light level equal to a predetermined high ambient light level and a control system for overriding the automatic exposure system in response to detecting of said predetermined level for providing a fixed effective aperture and fixed exposure time interval corresponding to the aperture-interval value defined by the automatic exposure system at the predetermined level whereby increased exposure is provided at light levels greater than the predetermined level to thereby provide a scene overexposure increasing with the amount of ambient light exceeding the predetermined level so as to provide acceptable exposure of a subject within that high light level scene.

13 Claims, 6 Drawing Sheets

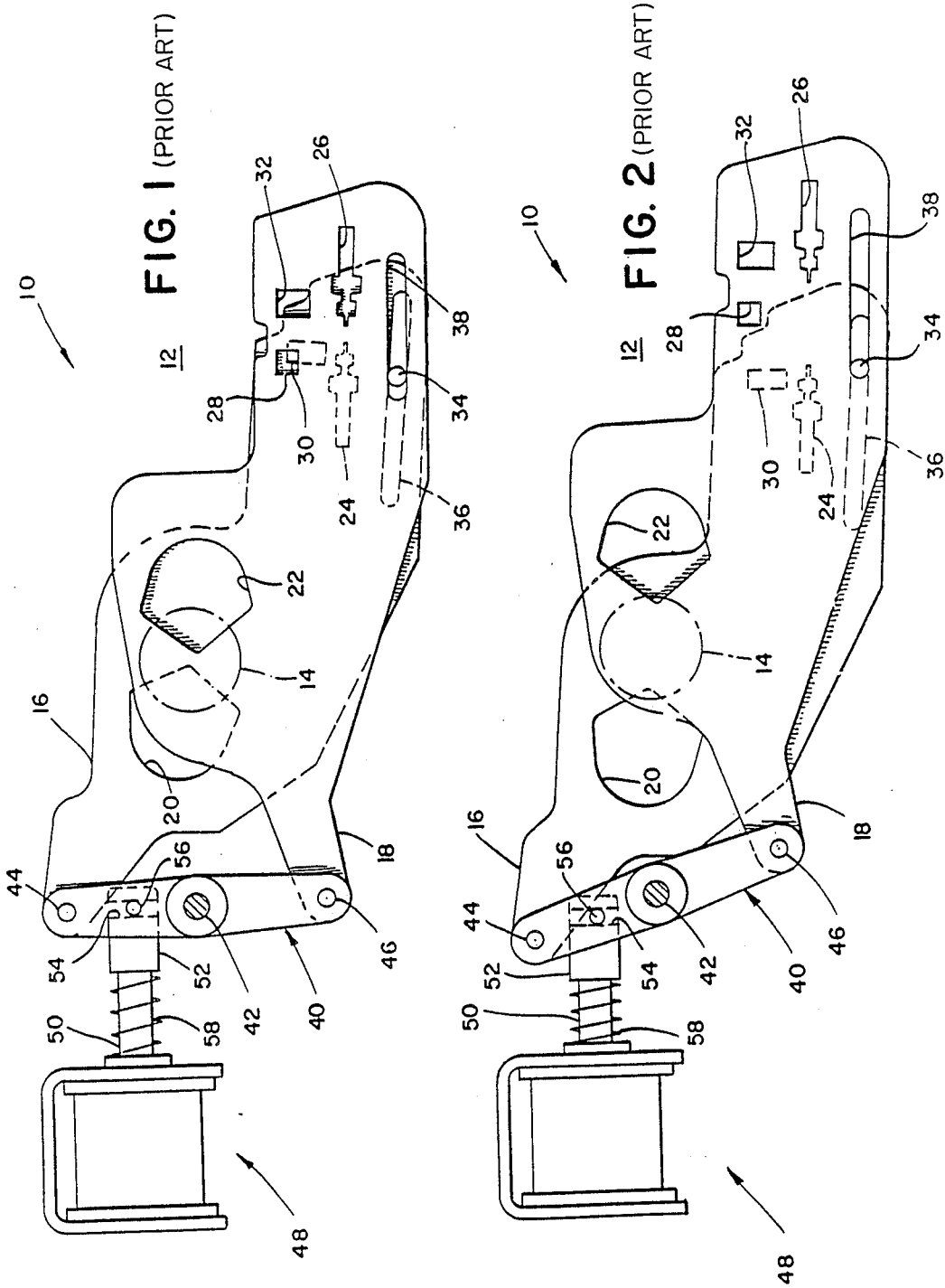

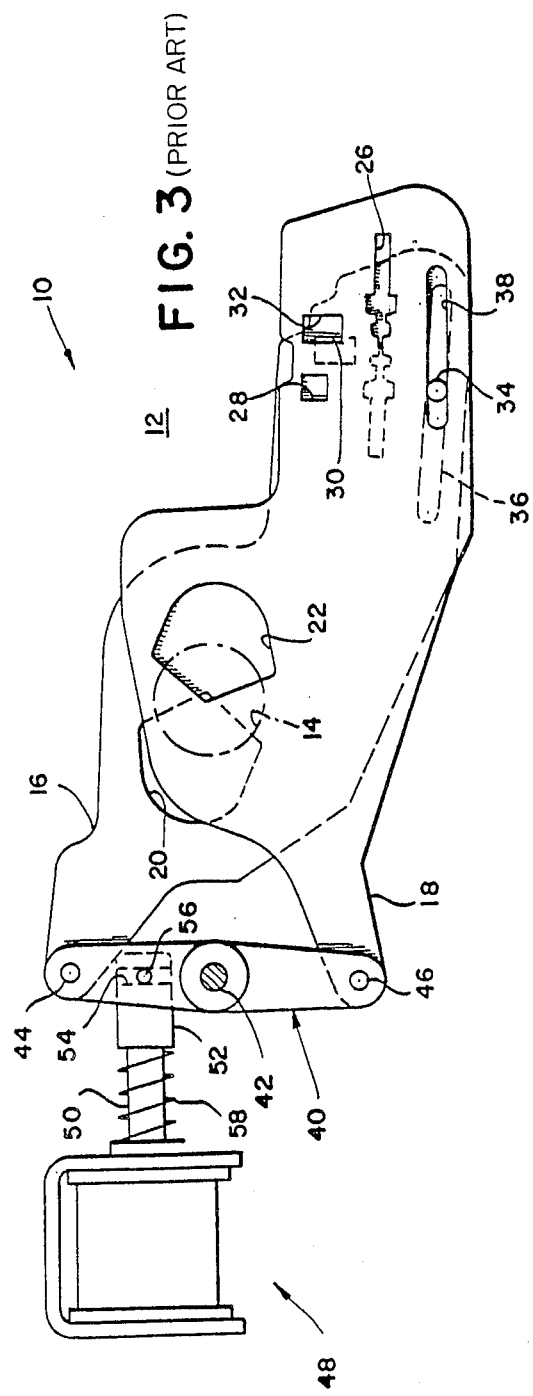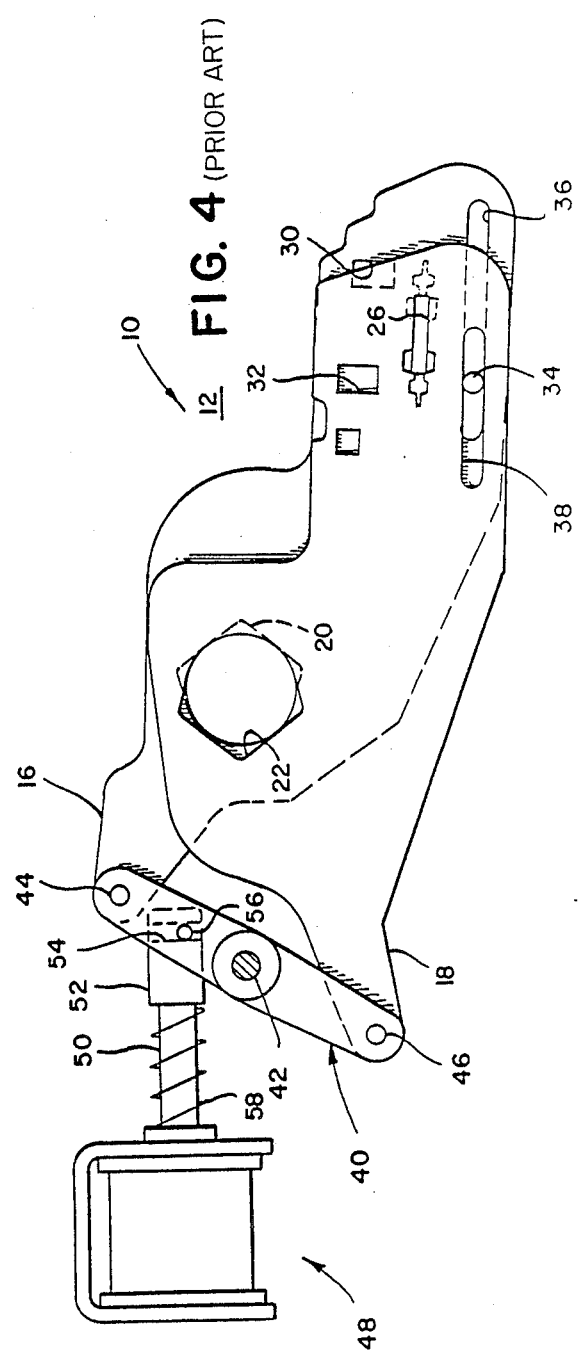

EXPOSURE CONTROL WITH FIXED TIME EXPOSURE AT HIGH LIGHT LEVELS

BACKGROUND OF THE INVENTION

This invention relates to photographic exposure control systems and, more particularly, to an automatic exposure control system for controlling aperture and exposure time interval parameters to accommodate very high ambient light levels incurred, for example, when photographing subjects in brightly illuminated snow and beach settings.

Modern cameras commonly incorporate automatic exposure control systems which employ integrated logic circuits and microprocessors to achieve automated control of substantially all camera operating parameters which contribute to proper exposure of film to a subject or scene to be photographed. Generally, these automatic exposure control systems receive and process input data such as film speed, the brightness level of ambient light reflected from the subject, and camera to subject distance to control the sequential operation of camera components such as a lens focussing mechanism, a shutter and/or aperture setting device, and a flash unit during the interval of time required for the depression of a camera actuating button. Also, such exposure control systems are used with a wide variety of exposure control mechanisms by which shutter interval and aperture size parameters are determined.

An automatic exposure control mechanism employing a scanning blade type shutter which, in operation, varies the aperture size simultaneously with the exposure interval is described in commonly assigned U.S. Pat. No. 3,942,183 entitled "CAMERA WITH PIVOTING BLADES", issued to George D, Whiteside on Mar. 2, 1976. Such scanning blade type shutter mechanisms generally include a pair of counter-reciprocating blade elements each having a primary aperture that traverses the optical axis of the camera during the exposure interval. The primary apertures are shaped so that on overlying one another during countermovement of the blades, an effective exposure aperture value is defined and which increases to a maximum value in a determinant period of time.

Generally, exposure control in such a scanning blade system is provided by a pair of secondary photocell apertures, one aperture in each of the blade elements, which admit scene light to a photocell in correspondence with the scene light admitted to the focal plane during shutter blade movement through an exposure cycle. The output from the photocell is directed to an integrator circuit which triggers upon reaching an integration level related to a desired exposure value or more precisely an aperture-interval value to terminate the exposure interval by returning the shutter blade elements back to their initial scene light blocking position.

Shutter mechanisms of the aforementioned type, and particularly the initial portion of the aperture curve are configured to provide an increased aperture-interval value at ambient light levels of about 800 candles per square foot, to provide an artificially high aperture-interval value in an attempt to reduce subject underexposure in such conditions.

Stated otherwise, within certain constraints, the system is generally designed to provide an aperture-interval value for each scene light level in keeping with, or in tracking relation to the exposure curve of the film to produce an average exposure for each level of scene light. At high light levels, however, based upon assumptions as to scenes commonly photographed, it has been found desirable to modify this tracking relation to provide greater aperture-interval values than that defined solely by the film parameters so as to deliberately produce scene overexposure to thereby offset underexposure of the subject.

Consequently, scanning shutter systems of the above-mentioned type, while providing decreasing aperture-interval values (defined as the function of aperture area and exposure interval) with increasing scene light levels, are configured to produce slightly greater than anticipated primary aperture values or smaller than anticipated secondary aperture values, or a combination of both, during the opening portion of the shutter scanning to provide a slightly larger aperture-interval value during the opening portion thereby producing overexposure of the scene when high scene light levels are encountered.

This increased scene exposure or "kick-up" is limited by the requirements of the blade aperture configuration and the ability of the shutter blades to respond to the electronic system, and therefore results in inadequate adjustment of the exposure when the camera is operated in such high ambient light. In any event, the described system cannot achieve the straightforward automatic exposure program of the present invention in which, above a select high light level, the exposure doubles with a doubling of the scene light.

In addition to the above, different types of photographic systems address the problem of subject underexposure encountered by automatic exposure systems when the ambient light level is high. Known systems, for example, incorporate such arrangements as spot metering of the subject illumination, complex sensing systems using multiple light level detectors and circuitry to compare the light level of the subject to the light level of the scene, or a manually operated trim mechanism which can be utilized to decrease the amount of light impinging upon the photocell to thus increase the effective aperture-interval value.

For example, commonly assigned U.S. Pat. No. 4,423,936 entitled "PHOTOGRAPHIC EXPOSURE CONTROL SYSTEM AND METHOD" issued to Bruce K. Johnson on Jan. 3, 1984 discloses a photographic exposure control system which automatically classifies ambient scene lighting conditions as normal, back-lit or fore-lit and then selects an exposure parameter signal program that is appropriate for the indicated condition. The system monitors a plurality of different portions of the scene area with a multi-sensor array that detects both subject range and ambient light intensity. Ambient light intensity measurements of the subject and non-subject areas are compared to classify the lighting conditions and to select the corresponding signal program which controls operation of the system components to vary the ratio of ambient to artificial light contribution to exposure for the indicated lighting conditions.

Commonly assigned U.S. Pat. No. 4,375,322 entitled "FULL RANGE VARIABLE PROPORTIONAL FILL FLASH SYSTEM" issued to Richard Coppa et al on Mar. 1, 1983 and U.S. Pat. No. 4,329,031 entitled "PHOTOGRAPHIC SYSTEMS FOR VARYING FLASH FIRE APERTURE AS A FUNCTION OF AMBIENT SCENE LIGHT" issued to Peter Carcia et al on May 11, 1982, disclose photographic exposure fill flash control systems which are designed to maintain the same proportional contribution to the film exposure from the ambient and artificial light during a film exposure.

Finally, commonly assigned U.S. Pat. No. 4,315,676 entitled "CAMERA WITH AUTO RANGING FOCUSING AND FLASH FIRE CONTROL" issued to Arthur LaRocque et al on Feb. 16, 1982 and U.S. Pat. No. 4,342,506 entitled "EXPOSURE TRIM MECHANISM FOR CAMERAS" issued to Bruce Johnson et al on Aug. 3, 1982 disclose automatic exposure control systems including manually operated exposure trim mechanisms by which the photographer may adjust the proper exposure settings depending on ambient light conditions. The trim mechanism includes a variable density filter which is moved over a photocell towards an extreme position of least transmittance thereby allowing the least amount of light to reach the photocell in order to increase the exposure interval. This could be utilized by a knowledgeable operator to increase the film exposure when the photographer recognizes the indicated special conditions of high ambient scene light intensity. The above trim mechanism not only provides a longer exposure interval by reducing the response of a photoresponsive cell to ambient light but also increases the tension on a spring mechanism which will accelerate the rate at which the shutter blades move to their open position thereby providing a larger effective aperture.

To some degree, the above mentioned exposure control systems address the problem of underexposure of the principal subject in lighting conditions of high ambient scene light but suffer from the drawbacks of requiring either a complex arrangement of a plurality of photocells and discrimination circuitry, the requirement of increasing the output of an artificial light source above a normal level which has practical limitations, or manually adjusted systems which require a photographer to discriminate between differing scene lighting conditions and make proper exposure adjustments.

SUMMARY OF THE INVENTION

In accordance with the present invention, an automatic exposure system for a camera is provided by which an ambient light level equal to or greater than a predetermined value related to a high ambient light level is detected and used for overriding an automatic exposure control to provide a fixed aperture and exposure time interval for obtaining a desired overexposure which increases with the amount of ambient light exceeding the predetermined value. An ambient light level sensor distinguishes between scene lighting conditions of normal ambient light levels and very high ambient light levels such as a beach scene.

In accordance with one embodiment of the present invention, a camera having an automatic scanning shutter exposure system includes a pre-exposure light level sensor capable of distinguishing an ambient light level equal to or greater than a predetermined value in the order of 500 to 600 candles per square foot. The sensor generates an electrical signal when the value of the ambient light exceeds a given level for use by an exposure control circuit which, in response to the electrical signal, triggers a fixed time for exposure, and thus also results in a fixed effective aperture of the scanning shutter system. Thus, at high light levels the camera shutter has a fixed exposure interval and will always scan out to a given (still relatively small) aperture for each cycle in which the ambient light level is over, for example, 570 candles per square foot. Consequently, since the aperture-interval value for high ambient light levels is fixed, at 1,000 candles per square foot where roughly a one stop overexposure is achieved while at 2,000 candles per square foot light levels a generally two stop overexposure is achieved. In this way the problem of underexposure of the principal subject in lighting conditions of high ambient light such as a beach scene is solved by the exposure control system in accordance with the present invention.

A principle object of the present invention is, therefore, to provide an automatic, relatively inexpensive and highly versatile system for insuring acceptable exposure of a subject to be photographed in high ambient light level conditions by a camera having an automatic exposure system. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIGS. 1-4 are front elevational views showing parts of a known scanning blade shutter mechanism with which the exposure control system of the present invention is particularly suited for use, the mechanism being shown in four different operating positions;

DETAILED DESCRIPTION OF THE PREFERRED EMBODIMENTS

Figure 5:
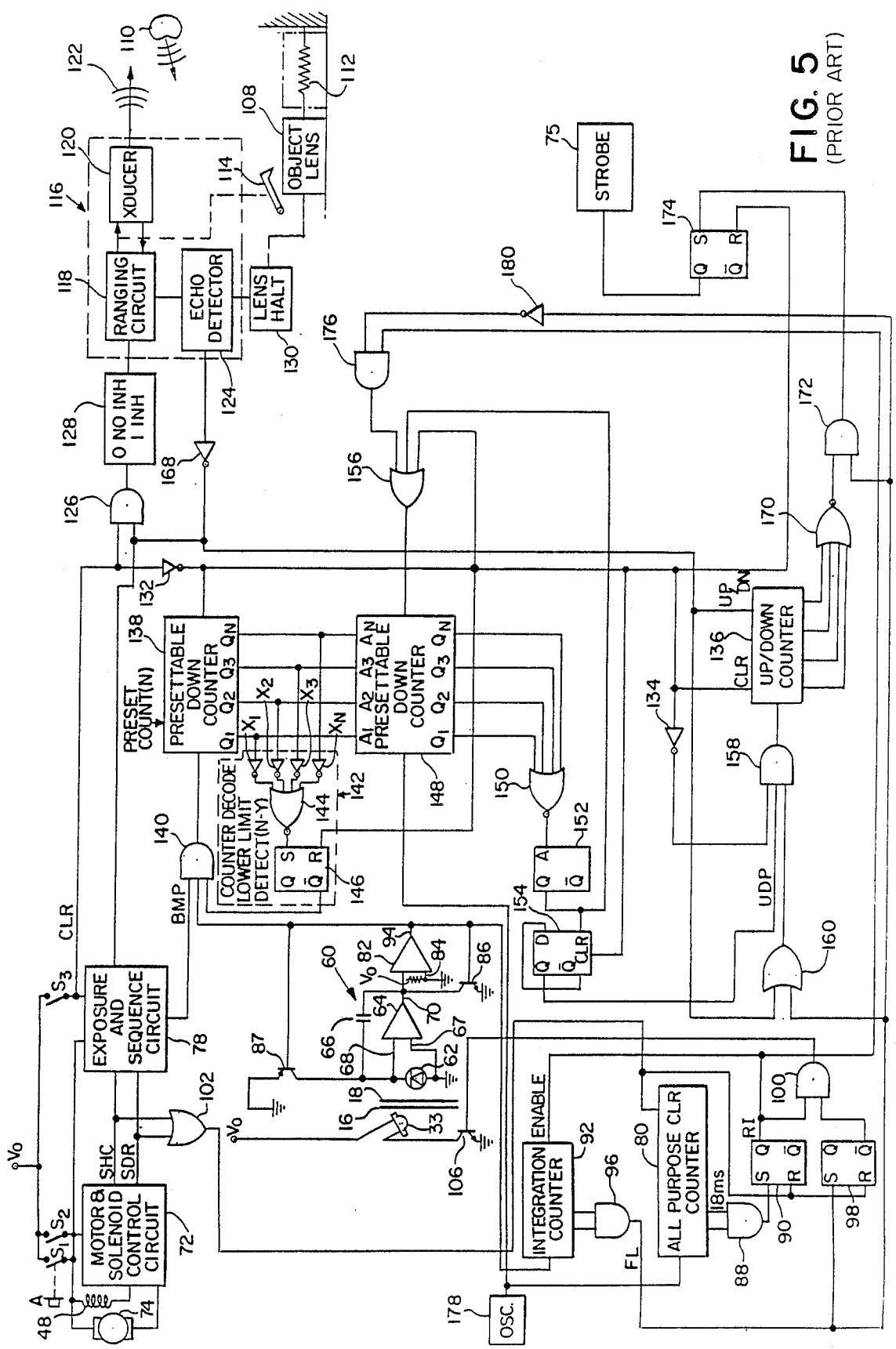
FIG. 5 is schematic circuit diagram showing a known automatic exposure control system to which an embodiment of the present invention may be added.

FIGS. 1-5 are duplicates (including reference characters) of the same drawing figures found in previously mentioned U.S. Pat. No. 4,329,031, expressly incorporated by reference herein, to facilitate reading the text of that patent with reference to FIGS. 1-5 as may be necessary or desirable for a full understanding of an exemplary embodiment of the present invention to be described hereinafter.

In FIGS. 1-4, the exposure control shutter mechanism of the prior art is generally designated by the reference numeral 10 and illustrated in four exemplary operating conditions, respectively. The shutter mechanism 10 includes two reciprocating blade elements 16 and 18 each including respectively, a primary scene light admitting aperture 20 and 22, a photo cell sweep secondary aperture 24 and 26, and a first light aperture 30 and 32. The shutter blade 18 also includes a pre-exposure ambient scene light admitting aperture 28. In front of the shutter blades, the camera (not shown) in which the mechanism 10 is mounted includes a light entry exposure opening 14, which defines the maximum exposure aperture for an objective lens 108 (FIG. 5).

A solenoid 48 and a spring 58 selectively drive a walking beam 40 to reciprocate the shutter blades 16 and 18 relative to each other and to achieve the various positions shown in FIGS. 1–4. The blades 16 and 18 are normally held by a latch mechanism (not shown) in the closed portions shown in FIG. 1 so that the solenoid 48 need not be constantly energized to oppose the force of the spring 58. Absent the latch mechanism or energization of the solenoid 48, the spring 58 would drive the shutter blades to move to the fully open position shown in FIG. 4. The drive force of the solenoid 48 is sufficiently greater than that of the spring 58 so that when energized, the solenoid stops the opening movement of the shutter blades and returns the blades to the initial closed position shown in FIG. 1. Such reciprocation of the blade elements produces a progressive variation of effective aperture openings.

Thus, FIG. 1 shows the relative positions of the shutter blades 16 and 18 prior to the initiation of an exposure cycle. In this position, the shutter is effectively closed since apertures 20 and 22 do not overlap. In FIG. 2, the solenoid has been activated so as to retract and cause the blade elements to move relative to one another so that a latch 114 (FIG. 5) is released and the pre-exposure ambient scene light admitting aperture 28 is no longer obstructed by shutter blade 16 and is now located in front of a photocell 62 (see FIG. 5). As shown in FIG. 3, the first light admitting apertures 30 and 32 track with the primary apertures 20 and 22 so that upon admittance of the first scene light to the film plane (not shown) the apertures 30 and 32 overlap to allow light from an LED 33 (FIG. 5) to be transmitted to the photocell 62.

FIG. 4 shows the primary apertures 16 and 18 in a maximum exposure scene light admitting and aperture defining position. Also as shown in FIG. 4, the photocell sweep secondary apertures 24 and 26, which track with the primary apertures 20 and 22, respectively, define a maximum scene light admitting opening in front of the photocell 62.

In FIG. 5, the prior art exposure control system used with the mechanism 10 is shown to include a lens assembly 108 biased to move through different focal positions by a tension spring 112 and held at an initial terminal position as shown in solid lines by the releasable latch 114. The system also includes a sonic range finder 116 including a ranging circuit 118, a sonic transducer 120 which transmits a sonar ranging signal comprising a burst of sonic energy 122, and an echo signal detector 124 which provides a signal indicative of the elapsed time period which corresponds directly to the distance between the camera and the subject to be photographed.

The exposure control system includes a scene light detecting circuit 60 including a photocell 62 connected across the terminals of an amplifier 64 which amplifies the signal from the photocell 62 and provides an ambient light level signal to the rest of the system as more fully described later herein.

A motor and solenoid control circuit 72 controls the energization of the solenoid 48 and a motor 74 which effects the advancement and processing of self developing film units in a well known manner. The control system also includes an electronic flash or strobe 75 which is fired to produce either a full or fill flash.

In operation of the control system, an exposure cycle is initiated by depression of an actuation button A to close a switch $S_1$ which signals an exposure and sequence circuit 78 to signal the motor and solenoid control circuit 72 to energize the solenoid 48. The solenoid 48 drives the shutter blades 16 and 18 from the position shown in FIG. 1 to the position shown in FIG. 2 but before the shutter blades reach the position shown in FIG. 2, a presettable down counter 138 is preset to a select binary count N and flip flops 146, 154 and an up/down counter 136 are cleared and reset.

Responsive to the shutter blades reaching the position shown in FIG. 2, the switches $S_2$ and $S_3$ are closed and the exposure and sequencing circuit 78 signals the motor and solenoid control circuit 72 to reduce the power supplied to the retracted solenoid. Closure of the switch $S_3$ causes a sonar inhibit circuit 128 to cease inhibiting the sonar rangefinding circuit 116 which provides a burst of sonic energy 122.

A presettable down counter 148 is preset to the binary count N along with the presetting of the counter 138. Closure of switch $S_3$ allows the counter 148 to start counting down from N at a rate dependent on the frequency F of the pulse train produced by a clock 178. When the counter 148 counts down to zero, a NOR gate 150 provides a high output signal to the one shot 152 which provides a high output signal to the flip-flop 154 and resets the counter 148 to the count N. Subsequently, the output of the one shot switches to a low level which allows the counter 148 to count down again. This cycle repeats so that the flip-flop 154 produces a digital pulse train output having a frequency equal to the frequency F of the clock 178 divided by two times the binary count N.

The up/down counter 136 receives this F/2N pulse train signal from the time the switch $S_3$ is closed until the rangefinder circuit 116 receives an echo signal from the photographic subject 110. During this ranging period, the counter 136 is in an up mode so that each pulse of the digital pulse train from the flip-flop 154 causes the counter 136 to count up one binary count. If the subject 110 being photographed is located too far away from the camera, the rangefinding circuit 116 does not receive an echo signal and therefore does not terminate the up count by the counter 136. When this happens, the counter 136 continues to count up until it fills and terminates the up count mode. Thus, the count in the counter 136 corresponds to the camera to subject range with a filled count corresponding to a range of infinity.

Subsequent to receipt of the echo signal from the object 110 by the rangefinding circuit 116, the exposure and sequence circuit 78 signals the motor and solenoid control circuit 72 to deenergize the solenoid 48 and allow the shutter blade elements 16 and 18 to move under the force of spring 58 toward the position shown in FIG. 3. Since the pre-exposure ambient scene light detect aperture 28 does not overlap the shutter blade 16 when the shutter blade mechanism is in the position shown in FIG. 2, ambient scene light is admitted to the photocell 62.

The photocell 62 responds to ambient light by producing an output which varies in intensity in correspondence with the intensity of ambient light. The amplifier 64 in cooperation with a feedback capacitor 66 produces a saw tooth type output signal which varies in frequency in correspondence with the intensity of the signal produced by the photocell 62.

A comparator 82 produces a digital pulse type signal in response to the saw tooth type output of the amplifier 64. The frequency of the digital pulse train produced by the comparator 82 at line 94 depends on the intensity of the ambient light incident on the photocell 62. The more intense the ambient light, the greater the frequency of the pulse train at line 94.

In synchronism with its deenergization of the solenoid 48, the exposure and sequence circuit 78 signals the AND gate 140 to pass the pulse train on the line 94 to the counter 138. Thus, the length of the pre-exposure measurement pulse generally corresponds to the time required for the pre-exposure ambient and scene light detect aperture 28 to be moved back into overlapping relationship with the shutter blade 16 thereby blocking ambient scene light from reaching the photocell 62.

The pulse train is produced by the comparator 82 while the photocell 62 is receiving ambient light through the pre-exposure ambient light aperture 28. Thus, the counter 138 counts down at a rate corresponding to the pulse rate of the digital pulse train from the comparator 82 which corresponds directly to the ambient light level. In other words, the higher the ambient light level, the quicker the counter 138 counts down from binary count N to a selected minimum down count (N-Y).

When the pre-exposure ambient scene light detected by the photocell 62 is at a relatively low level, the period of the pulse train produced by the comparator 82 may be equal to or greater than the duration of the time alloted for ambient light measurement so that the counter 138 may not count down any pulses from the preset count N. When the pre-exposure ambient scene light level is between the relatively low level and a normal, but yet relatively high level, the period of the digital pulse train produced by the comparator 82 will be short enough so that the counter 138 counts down, but not so short that the counter 138 counts down to the minimum count value (N-Y). When ambient scene light levels are normal, but at or above the indicated high level, the period of the digital pulse train produced by the comparator 82 may be very short so that the counter 138 counts down from N to the selected minimum count (N-Y) which is decoded by the counter decode circuit 142. In essence, the counter 136 produces a count which distinguishes between low light levels requiring full flash and normal light levels requiring fill flash.

About 18 milliseconds after the deenergization of the solenoid 48 and initiation of the pre-exposure ambient light level measurement, the all purpose counter 80 provides an enable signal to the integration counter 92 and a signal which causes the LED 33 to be energized for a first light detect function. As the shutter blades 16 and 18 reach the position shown in FIG. 3, the first light detect apertures 30 and 32 overlap so as to admit the light produced by the LED 33 to impinge on the photocell 62. At the same time that the photocell 62 is receiving light from the LED 33, the photocell just begins to receive ambient scene light through the sweep secondary apertures 24 and 26, and the film plane (not shown) just begins to receive scene light through the primary apertures 20 and 22.

The photocell 62 responds to both artificial light from the LED 33 and ambient scene light to produce a high intensity signal which the amplifier 64 and comparator 82 amplify and digitize to produce a digital pulse train fed to the integration counter 92. When the integration counter 92 reaches a preselected count, it is decoded by an AND gate 96 and produces a "first light" signal along line FL which causes the LED 33 to be deenergized and signals the start of the exposure interval. Thus, it causes the flash countdown to begin by triggering the counter 148 to count down from the binary count established in the counter 138 during the pre-exposure ambient light level measurement. In turn, the counter 148, through the multivibrator 152 and the flip-flop 154, provides a digital pulse train to the up-/down counter 136 which has been switched to the down mode so as to count down to zero.

When the counter 136 reaches zero, the strobe 75 is fired to provide a fill or full flash. The time it takes for the counter 136 to count down to zero depends on both the range of the object 110 being photographed and the ambient scene light level. That is, the count in the counter 136 is dependent upon the distance of the subject from the camera, whereas the rate of count down is dependent upon the pre-exposure ambient value originally stored in the counter 138. Thus, the camera provides a follow-focus, fill flash or full flash capability.

Although not shown in FIG. 5, integration of scene light transmitted by secondary apertures 24 and 26 during the exposure interval is utilized to provide an end exposure signal to the motor and solenoid control circuit 72 as is more fully described in commonly assigned U.S. Pat. No. 4,192,587 entitled "Proportional Fill Flash", issued to Arthur G. LaRocque et al on Mar. 11, 1980 and previously mentioned U.S. Pat. No. 4,444,478 and both now incorporated herein by reference.

Figure 6:
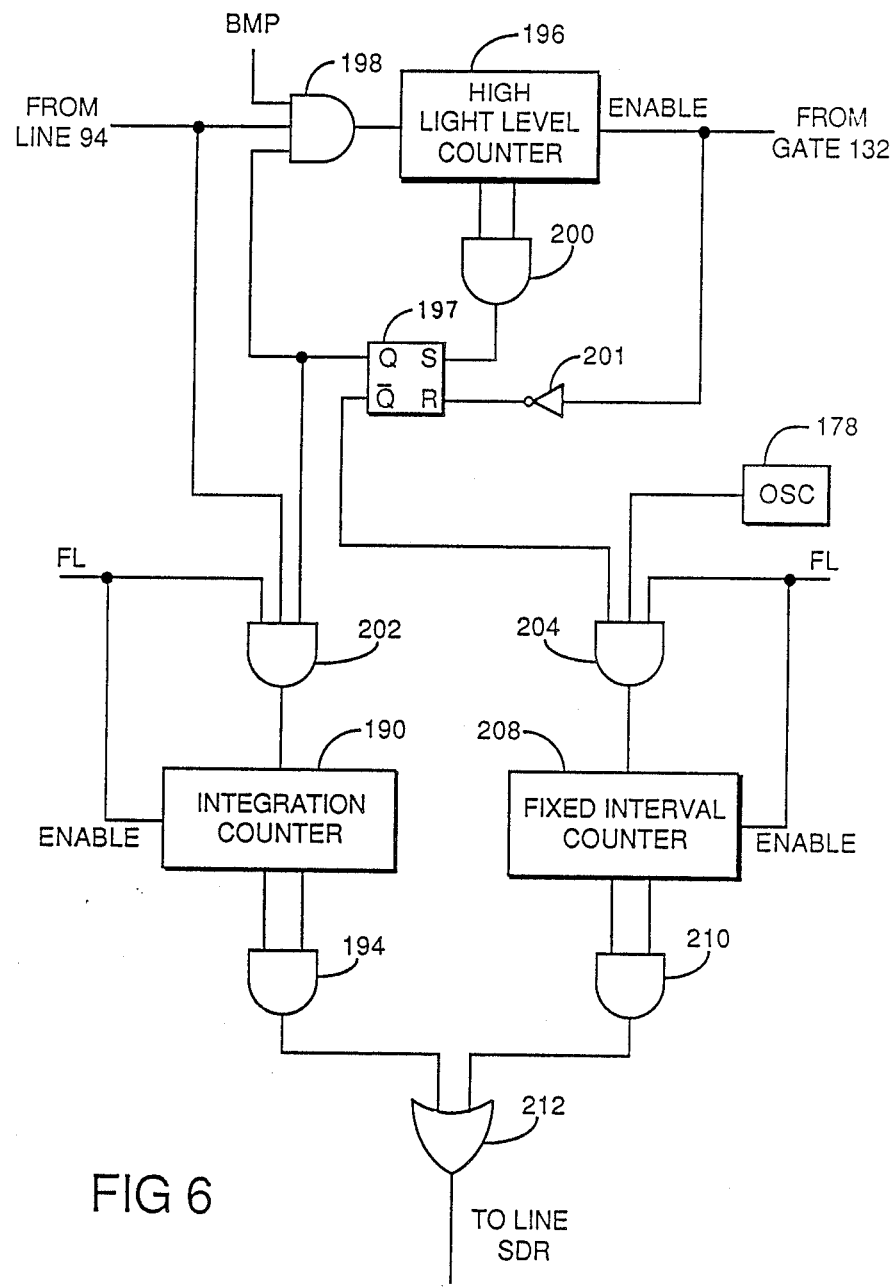
FIG. 6 is a schematic circuit diagram showing a portion of an exposure control system in accordance with one embodiment of the present invention.

The exposure integration may, of course, be implemented in a variety of ways, and is shown in FIG. 6 for clarity of the present description merely as a separate integration counter 190 enabled by the "first light" signal along line FL from decoder 96 (FIG. 5) to now receive the output on line 94 from the light sensing network 60.

Thus, once the first light counter 92 has reached its selected count (indicating the commencement of the exposure interval), it enables counter 190 which, in turn, initiates integration counting of the ambient light level in tracking relation to the exposure light admitted to the film by the primary apertures 20 and 22. Upon reaching a selected count, the integration counter 190, through a decoder 194, provides a solenoid energization signal to the exposure and sequence network 78 or directly on the line SDR to the motor and control circuit 78 to terminate the exposure. Under special circumstances, the termination signal from decoder 194 may also be delayed by a fixed time as described in U.S. Pat. No. 4,192,587.

Thus, it should be appreciated that the prior art camera ranges to set the lens position and count up in the flash counter 136. It then de-energizes the solenoid to start opening the shutter. As the shutter starts to move, a pre-exposure measurement is delivered to the counter 136 in conjunction with operation of the counter 148. After 18 milliseconds, the counter 92 is enabled to evaluate the combined diode light and ambient light to signal first light of the shutter or, that is, commencement of the exposure interval. The first light signal then triggers the start of exposure integration and count down of the flash counter 136 at a rate determined by the count stored in the counter 138. When the counter 136 reaches zero, the flash is fired, and the exposure interval completed by energizing the solenoid, the latter being signalled by integration during the interval or the combination of that integration and the other factors such as whether the fire flash has previously occurred or has yet to occur.

Referring now to FIG. 6, there is shown a schematic circuit diagram illustrating a modification to the prior art automatic exposure control system shown in FIG. 5 in accordance with one embodiment of the present invention. In this arrangement, a high light level counter 196 has been added to the circuit for operation synchronously with the counter 138 during the pre-exposure pulse so as to determine when the ambient light level exceeds a predetermined high light level value. Thus, the counter 196 (in addition to the counter 138) is fed the pulse train of the light sensing network 60 from the line 94 by means of a gate 198. As explained in more detail below, a decoder 200 of the counter 196 by means of a flip flop 197 and AND gates 202 and 204 control whether the integration counter 190 or a fixed interval counter 208 determine the termination of the exposure interval. In effect, the counter 196, flip flop 197 and gates 200, 202 and 204 provide a switch means for bypassing the automatic aperture-interval value which varies with ambient, and for selecting a fixed aperture-interval value or, that is, a fixed interval and effective aperture in response to the ambient scene light equaling or exceeding the select, very high ambient light level.

Just prior to initiation of the pre-exposure evaluation, the flip flop 197 is set from gate 132 and the counter 196 is enabled. The high (logic 1) signal from gate 132 is inverted by an invertor gate 201 to set flip flop 197 with Q low and Q high. For light levels less than the selected level, i.e., 570 cps, the decode point of the counter 196 is not reached, and the output of the decoder 200 remains at a low level which allows the flip flop 196 to remain as originally set such that the gate 202 receives a high signal from terminal Q and gate 204 receives a low signal from terminal Q of flip flop 197.

Now, the signal FL from the decoder 96 (FIG. 5) changes from low to high, when the counter 92 fills, to signal the start of the exposure interval. The high signal FL will enable both the integration counter 190 and the fixed interval counter 208. However, only AND gate 202 is triggered to pass the light evaluation signal along line 94 to the counter 202 since it matches the high signal from the Q terminal of the flip flop 197. On the other hand, the gate 204 is held off since a low signal is received from the Q terminal of the flip flop 197.

At very high light levels, however, the counter 196 fills and is decoded by the decoder 200 thereby signalling the flip flop 197 to set Q low and Q high. This then holds off operation of the gate 202 and triggers the gate 204 when the high FL signal is received. Consequently, for high light levels the fixed interval counter 208 receives the pulse train from the oscillator 178 while the counter 190 is precluded from receiving the integration pulse train.

The fixed interval counter is fed by the oscillator 178, and its decode 210 provides the end exposure signal when it reaches a set count representing a fixed time equal to the time expected from operation of the integration counter 190 (and its decoder 194) under an ambient light level just equal to the predetermined level, or that is, the light level which will just trip the set count of the counter 196.

As illustrated in FIG. 6, the integration counter 190 and the fixed interval counter 208 are decoded by decoders 194 and 210, respectively, and their signals delivered to an OR gate 212 for delivery to line SDR as an end exposure signal which will provide energization of the solenoid and closing of the shutter.

Thus, at the initiation of the exposure interval, for low or normal light levels less than the high ambient light levels represented by the select pulse count of the counter 196 only the gate 202 is enabled along with the integration counter 190 by the signal on line FL, and thus, the counter 190 counts the pulses from the sensing circuit 60 up to a set point at which decoder 194 transmits an end of termination signal through gate 202 to the exposure and sequence circuit 78.

On the other hand, at high ambient light levels exceeding the set count of the counter 196, the flip flop 197 is changed to, in effect, preclude passage of the light sensing train to the integration counter 190 while permitting passage of the oscillator 178 output to the fixed interval counter 208 which, in turn, will ultimately provide the end exposure signal.

In this manner, the exposure system shown in FIG. 6 provides a fixed effective aperture and fixed exposure time interval when the ambient light level is equal to or greater than the predetermined high ambient light level. This fixed effective aperture and exposure time interval provides a desired overexposure of the overall scene when ambient light levels are greater than the predetermined high ambient light level so that a subject in such a very high ambient light level scene, such as a beach or snow scene, is properly exposed.

Figure 7:
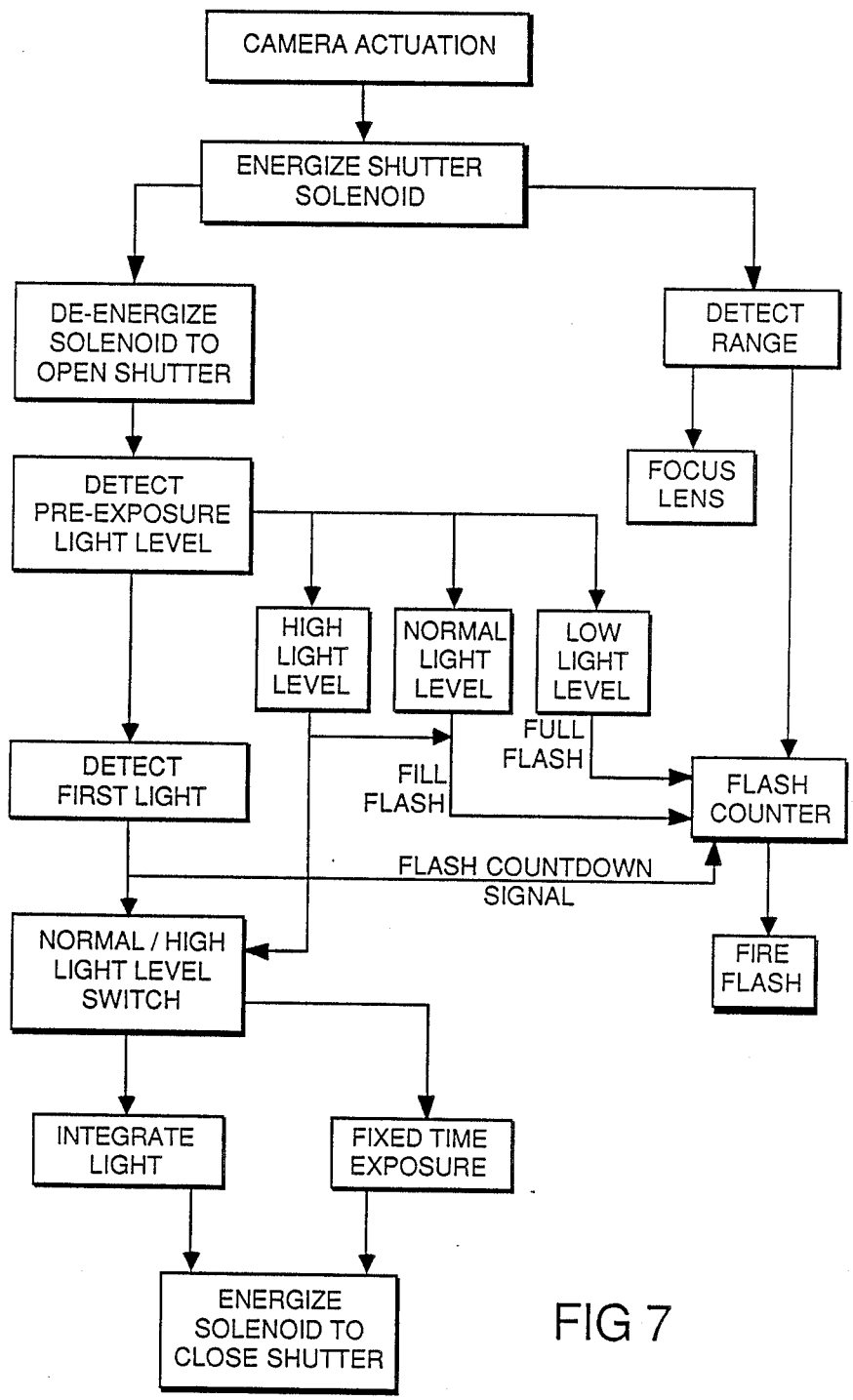
FIG. 7 is a schematic flow chart showing the sequence and logic associated with the exposure control system in accordance with one embodiment of the present invention.

Referring now to FIG. 7, there is shown a flow chart illustrating the operation of the exposure control system shown in FIG. 6. The sequence of events begins with camera actuation in response, for example, to depression of the camera actuator A (FIG. 5) by a photographer. This initiates detection of the range of the camera to the subject and the subsequent positioning of the objective lens 108. Also as shown in FIG. 7, camera actuation initiates pre-exposure light level detection which, in cooperation with the light detecting circuit 60, distinguishes between a low or normal light level to select either a full or fill flash. The latter is provided by a flash counter in conjunction with the range signal, which upon receipt of the first light detect signals counts down to precise fire flash time. Additionally, in accordance with the present invention, the pre-exposure detect further distinguishes a very high level which is utilized in conjunction with an electronic switch arrangement to select a fixed time exposure, rather than an ambient controlled exposure.

Consequently, at and above the predetermined high ambient light level, the exposure system will develop a fixed effective aperture and fixed exposure time interval corresponding to that aperture-interval value defined by the automatic exposure system at the predetermined light level and thus automatically provide increasing aperture-interval values at light levels greater than the predetermined light value to provide a desired overexposure increasing with the amount of ambient light exceeding the predetermined value. Except for bypassing the scene light integration during exposure, and replacing the latter operation with a fixed exposure interval, the operation of the preferred embodiment essentially follows the conventional sequence of events as described with reference to FIG. 5, including deenergization of the solenoid to allow the shutter blades to pivot so as to open the shutter, and subsequent energization of the solenoid to close the shutter to end the exposure cycle. In accordance with the present invention, only when the system detects a pre-exposure high ambient light level which is equal to or greater than a predetermined ambient light level does it produce a very high ambient signal which triggers a switch so as to bypass light integration and provide a fixed effective aperture and fixed exposure time interval corresponding to the aperture-interval value determined by the automatic exposure system at the predetermined ambient light level.

It should be understood that when the very high light level is detected, the counter 138 (FIG. 5) will also, in conjunction with the subject range, set the flash counter 136 to provide a fill flash. However, the count of the flash counter 136 could also be either radically altered or the counter bypassed entirely when very high light levels are detected so as to provide a different flash contribution to the exposure, selected in accordance with the very high light level detect to additionally illuminate the subject and thus improve its exposure versus the surroundings. For example, the flash intensity or time of fire could be altered. In the latter case, the flash could be fired in response to the end exposure signal from the decoder 208 to thereby fire the flash at the maximum aperture achieved in the exposure.

Figure 8:
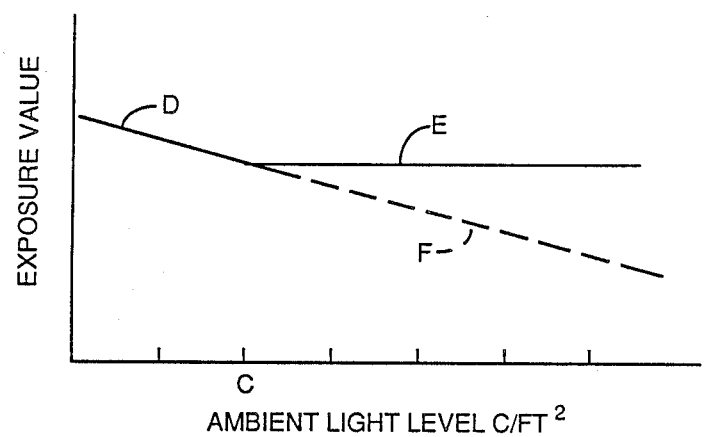
FIG. 8 is a graphical representation showing the variation in the effective aperture value developed by the present exposure control system versus the variation in ambient scene light intensity.

Referring now to FIG. 8, the solid line made up of line segments D and E shows the aperture-interval values developed by the exposure system in accordance with the present invention, for example, produced by the system shown in FIGS. 6 and 7. The solid line segment D and the dashed line F, together show the aperture-interval values developed by a conventional automatic exposure system shown in FIG. 5.

The downwardly sloping line D shows the reduction in aperture-interval value in correspondence with increasing ambient light levels. However, in accordance with the present invention, the aperture-interval value has a minimum value which is selected to correspond to the aperture-interval value defined by the automatic exposure system when the ambient light level is equal to a predetermined high ambient light level C.

The area between the solid line E and the dashed line F corresponds to the desired overexposure developed by the present exposure system. As shown, the amount of overexposure increases with increasing ambient light levels above C c/ft$^2$.

In accordance with the present invention, for ambient scene light intensities above C candles per per square foot, increasing aperture-interval values are achieved so that the desired overexposure increasing with the amount of ambient light exceeding C candles per square foot is accomplished. If C is equal to 500 candles per square foot, for example, at 1,000 candles per square foot ambient light levels approximately a one stop overexposure is provided and at 2,000 candles per square foot ambient light levels a two stop overexposure occurs.

It should be noted that in the illustrated embodiment, the automatic exposure control is altered by bypassing light evaluation during the exposure interval and substituting a timer arrangement such as an electronic switch having a pulse counter for evaluating a pre-exposure light pulse for selecting a fixed time interval and a counter timer fed by an oscillator clock. However, other forms of an electronic switch and logic network can be utilized as well as an RC timing network, for example.

Thus, it will be appreciated that as a result of the invention, a highly effective, relatively simple and inexpensive automatic exposure control system is provided to ensure suitable exposure of a subject in lighting conditions of high ambient light and by which the principle objective among others is completely fulfilled. Also it will be apparent to those skilled in the art and it is contemplated that variations and/or changes in the embodiments described herein may be made without departure from the present invention. Accordingly, it is intended that the foregoing description is illustrative only, not limiting, and that the true spirit and scope of the present invention will be determined by reference to the appended claims.

We claim:

1. In a camera having an automatic exposure system providing decreasing aperture-interval values with increasing ambient scene light levels, the improvement comprising:

light level detection means for detecting an ambient light level equal to or greater than a predetermined value of a high ambient light level; and override means for overriding the automatic exposure system in response to detection by said detection means of an ambient light level equal to or greater than said predetermined value to provide a fixed effective aperture and fixed exposure interval resulting in a fixed aperture-interval value under ambient conditions equal to or exceeding said predetermined value and thereby providing a desired scene overexposure increasing with the increase of ambient light exceeding said predetermined value to produce an adequate subject exposure.

2. The camera of claim 1, wherein the predetermined ambient light level value is in the order of 500 candles per square foot and the fixed effective aperture and fixed exposure interval provides approximately a one stop scene overexposure at 1,000 candles per square foot ambient light level and approximately a two stop overexposure at 2,000 candles per square foot ambient light level.

3. The camera of claim 1, wherein the automatic exposure system includes a low light level evaluating means for evaluating the ambient light level just at or prior to the commencement of an exposure interval to distinguish between low and normal ambient light levels, and said override means is coupled to said low light level means to evaluate ambient light levels equal to or exceeding said predetermined value.

4. The system of claim 1 wherein said automatic exposure system is configured to provide aperture-interval values smaller than said fixed aperture-interval value, and said fixed aperture-interval value is substantially equal to the aperture-interval value provided by said automatic exposure system at an ambient light level equal to said predetermined value.

5. The system of claim 1 wherein said automatic exposure system includes interval evaluating means for evaluating at least a portion of the ambient light transmitted to the camera film plane during an exposure interval for defining the aperture-interval value, and said override means includes means responsive to an ambient light level equal to or exceeding said predetermined value for substituting a means for providing said fixed aperture-interval value for said interval evaluating means.

6. The camera of claim 5, wherein the automatic exposure system includes a scanning blade type shutter mechanism.

7. The camera of claim 1 wherein said override means includes a timer means for providing a fixed exposure interval, and switch means responsive to detection of an ambient light level equal to or exceeding said predetermined value for bypassing said interval evaluating means and for actuating said timer means to define said fixed exposure interval.

8. The camera of claim 7 wherein said automatic exposure system includes a scanning blade type of shutter which provides varying aperture values during shutter actuation, whereby said fixed exposure interval automatically also defines a fixed effective aperture for said exposure interval.

9. The camera of claim 8 wherein said fixed exposure interval is substantially equal to the exposure interval defined by said automatic exposure system at an ambient level substantially equal to said predetermined value.

10. In an automatic exposure camera capable of functioning in accordance with information received from a light sensor to provide decreasing aperture-interval values with increasing ambient light levels, a high ambient light level control system comprising:
ambient light level detection means for detecting an ambient light level equal to or greater than a predetermined value and for generating an electrical signal corresponding to detection of said predetermined value; and
a high ambient light level control circuit responsive to said electrical signal for triggering a fixed aperture-interval value for exposure in said ambient light equal to or greater than said predetermined value so as to produce an overexposure of the high ambient level scene and more suitable exposure of the subject in said scene.

11. The article of claim 10 wherein said control circuit provides a fixed effective aperture and a fixed time interval equal to the aperture and interval value provided by said camera for an ambient light level equal to said predetermined value.

12. A method of properly exposing a subject located in a scene of high ambient light using a camera having an automatic exposure system, comprising the steps of:
detecting the pre-exposure ambient light level and distinguishing a high ambient light level equal to or greater than a predetermined ambient light level,
overriding the automatic exposure system in response to detection of said predetermined ambient light level to provide a fixed effective aperture and fixed interval for exposure.

13. The method of claim 12, wherein said fixed effective aperture and fixed interval for exposure are maintained at the aperture-interval value normally defined by the automatic exposure system at said predetermined ambient light level.

* * * * *